United States Patent
Lavi

(10) Patent No.: US 9,759,611 B2
(45) Date of Patent: Sep. 12, 2017

(54) DUAL SPECTRAL IMAGER WITH NO MOVING PARTS

(71) Applicant: Moshe Lavi, Nofit (IL)

(72) Inventor: Moshe Lavi, Nofit (IL)

(73) Assignee: CI SYSTEMS (ISRAEL) LTD., Migdal Ha'emek (IL)

( * ) Notice: Subject to any disclaimer, the term of this patent is extended or adjusted under 35 U.S.C. 154(b) by 0 days.

(21) Appl. No.: 14/949,909

(22) Filed: Nov. 24, 2015

(65) Prior Publication Data

US 2016/0161338 A1 Jun. 9, 2016

Related U.S. Application Data

(60) Provisional application No. 62/088,606, filed on Dec. 7, 2014.

(51) Int. Cl.
*G01J 5/00* (2006.01)
*H04N 5/33* (2006.01)

(52) U.S. Cl.
CPC .............. *G01J 5/0014* (2013.01); *H04N 5/33* (2013.01)

(58) Field of Classification Search
CPC ................................ G01J 5/0014; H04N 5/33
See application file for complete search history.

(56) References Cited

U.S. PATENT DOCUMENTS

| | | | | |
|---|---|---|---|---|
| 4,081,207 A * | 3/1978 | Dippel | ................ | G02B 5/04 348/E3.01 |
| 4,808,808 A * | 2/1989 | Karasaki | ............... | G02B 7/343 250/201.2 |
| 5,206,502 A * | 4/1993 | Gardner | ................... | G01J 3/02 250/226 |
| 5,636,027 A * | 6/1997 | Spengler | ............... | G01B 11/06 250/559.28 |
| 5,784,507 A * | 7/1998 | Holm-Kennedy | .... | G01J 3/0259 250/227.23 |
| 2004/0075827 A1* | 4/2004 | Byrne | .................... | G01N 21/43 356/128 |
| 2005/0263682 A1* | 12/2005 | Eikenberry | ............. | G01J 1/04 250/216 |
| 2006/0241495 A1* | 10/2006 | Kurtz | .................. | A61B 5/0059 600/476 |
| 2007/0145310 A1* | 6/2007 | Liang | .................... | G01T 1/2014 250/580 |

* cited by examiner

*Primary Examiner* — Marcus Taningco
(74) *Attorney, Agent, or Firm* — Mark M. Friedman

(57) ABSTRACT

A device images radiation from a scene in two wavelength bands. An uncooled detector of the radiation includes two separate detector regions. A first filter associated with the first detector region allows radiation in a first wavelength band to be imaged on the first detector region. A second filter associated with the second detector region allows radiation in a second wavelength band to be imaged on the second detector region. An image forming optical component forms an image of the scene on the detector. Two wedge-shaped components are positioned at a fixed distance from the image forming optical component. Each wedge-shaped component directs radiation from the scene through the image forming optical component onto the detector. The radiation is imaged separately onto the two detector regions through an f-number of less than approximately 1.5. Imaged radiation on each detector region includes radiation in one respective wavelength band.

19 Claims, 3 Drawing Sheets

DUAL SPECTRAL IMAGER WITH NO MOVING PARTS

CROSS-REFERENCE TO RELATED APPLICATIONS

This application claims priority from U.S. Provisional Patent Application No. 62/088,606, filed Dec. 7, 2014, the entirety of which is incorporated herein by reference. This application is related to the commonly owned U.S. Patent Application entitled Drift Correction Method for Infrared Imaging Device (U.S. patent application Ser. No. 14/949,906), filed on the same date as this application, the disclosure of which is incorporated by reference in its entirety herein.

TECHNICAL FIELD

The present invention relates to the detection and imaging of infrared radiation.

BACKGROUND THE INVENTION

In order to detect and image gas clouds, especially through the use of infrared detection systems over a wide spectral range, it is often necessary to spectrally limit the incoming radiation to selected wavelength bands using spectral filtering techniques. This is accomplished by measuring the radiation emitted by a background of the gas cloud in two different wavelength bands, one which is absorbed by the gas cloud, and one which is not absorbed by the gas cloud.

Devices which can detect and image gas clouds have a wide range of applications, such as, for example, constant monitoring of a scene in industrial installations and facilities for gas leakages, and identifying escaping gases from gas transporting vehicles subsequent to traffic accidents. Typically, detectors which detect radiation in the visible spectral range are of lower cost than infrared detectors. However, since most hazardous gases of interest lack colors in the visible spectral range, such devices must use higher cost infrared detectors. Typically, the least expensive infrared imaging detectors relevant for such applications are uncooled detectors.

For some of the above applications, for example when the device must provide an alarm at cloud concentrations and size combinations above predetermined thresholds, quantitative data are required. To this end, these devices must use at least two spectral filters for filtering two selected wavelength bands, radiation in one wavelength band which is absorbed by the gas, and radiation in the other wavelength band which is not absorbed by the gas. The radiation in each wavelength band is imaged and analyzed separately. Device calibration methods and mathematical algorithms can be used to subsequently transform this quantitative data into scenes where the cloud image (when present) is shown, and where the quantitative information on the optical density of the specific gas of interest is stored pixel by pixel. Such a double filtering configuration is necessary in order to take into account contributions to the signals due to background infrared self-emission and drifts thereof brought about by background temperature drifts. This double filtering can be achieved with a spectral scanning method in which there is movement of an optical component of the device, such as, for example, an interferometer, a set of band pass filters mounted on a rotating wheel, or a scanning mirror to gather spectral information. Devices based on uncooled detectors must be designed with a large focusing lens numerical aperture (low f-number) in order to increase detector sensitivity to the radiation of interest relative to environment radiation. This is due to the fact that such detectors have a wide field of view. Designing an optical system with such a low f-number can be achieved with the above mentioned moving components. However, movements of optical components causes decreased system reliability, thereby increasing maintenance and operating cost of the device. In order to reduce maintenance and cost, filtering techniques can be implemented without moving parts via prisms, beam splitters, or beam combiners. However, such techniques have the effect of decreasing the focusing lens numerical aperture, thereby decreasing the sensitivity of the system to the radiation of the scene of interest relative to the environment radiation.

SUMMARY OF THE INVENTION

The present invention is a device and method for simultaneously detecting and imaging infrared radiation in at least two wavelength bands. The device and method avoids the use of moving parts, for higher reliability, without appreciably compromising on high numerical aperture (low optical f-number) for high sensitivity, and still using lower cost uncooled imaging detectors.

According to an embodiment of the teachings of the present invention there is provided, a device for imaging radiation from a scene, the radiation including at least a first and second wavelength band, the device comprising: (a) a detector of the radiation from the scene, the detector being uncooled and including a first and second detector region, the first and second detector regions being separate; (b) a first and a second filter, the first filter associated with the first detector region for allowing radiation in the first wavelength band to be imaged on the first detector region, the second filter associated with the second detector region for allowing radiation in the second wavelength band to be imaged on the second detector region; and (c) an optical system for focusing the radiation from the scene onto the detector, the optical system comprising: (i) an image forming optical component for forming an image of the scene on the detector, and (ii) first and second substantially wedge-shaped components, the first wedge-shaped component associated with the first filter, the second wedge-shaped component associated with the second filter, each of the wedge-shaped components fixedly positioned at a distance from the image forming optical component, each of the wedge-shaped components directing radiation from a field of view of the scene through the image forming optical component onto the detector, such that the radiation is imaged separately onto the first and second detector regions through an f-number of the optical system of less than approximately 1.5, the imaged radiation on each of the detector regions including radiation in one respective wavelength band.

Optionally, each of the first and second filters is a band pass filter.

Optionally, the first filter is disposed on one of a first surface or a second surface of the first wedge shaped component, and the second filter is disposed on one of a first surface or a second surface of the second wedge shaped component.

Optionally, the first surface of the first wedge-shaped component is a closest surface of the first wedge-shaped component to the image forming optical component, and the first surface of the second wedge-shaped component is a closest surface of the second wedge-shaped component to the image forming optical component, and the second surface of the first wedge-shaped component is a closest surface of the first wedge-shaped component to the scene, and the second surface of the second wedge-shaped component is a closest surface of the second wedge-shaped component to the scene.

Optionally, an antireflective material is disposed on at least one of a first surface and a second surface of the first wedge-shaped component, and on at least one of a first surface and a second of the second wedge shaped component.

Optionally, the first and second wedge-shaped components are substantially symmetrically disposed relative to an optical path of radiation.

Optionally, each of the first and second wedge-shaped components is oriented at a respective angle relative to an optical path of radiation from the scene to the detector.

Optionally, the presence of the first and second wedge-shaped components results in a vertical field of view approximately halved with respect to a field of view of the device defined by the image forming optical component.

There is also provided according to an embodiment of the teachings of the present invention, a method for imaging radiation from a scene, the radiation including at least a first and second wavelength band, the method comprising: (a) fixedly positioning a first and a second substantially wedge-shaped component at a distance from an image forming optical component; (b) directing radiation from a field of view of the scene by the first wedge-shaped component through the image forming optical component onto a first region of an uncooled detector; (c) filtering the directed radiation by the first wedge-shaped component to allow radiation in the first wavelength band to be imaged on the first region of the detector; (d) directing radiation from the field of view of the scene by the second wedge-shaped component through an image forming optical component onto a second region of the detector, the first and second regions of the detector being separate; (e) filtering the directed radiation by the second wedge-shaped component to allow radiation in the second wavelength band to be imaged on the second region of the detector; and (f) imaging the radiation from the field of view of the scene onto the detector, the distance from the image forming optical component being such that the radiation is imaged separately onto the first and second regions of the detector through an f-number less than approximately 1.5, and the imaged radiation on each of the regions of the detector including radiation in one respective wavelength band.

Optionally, the method further comprises: (g) orienting each of the first and second wedge-shaped components at a respective angle relative to an optical path of radiation from the scene to the detector.

Optionally, the method further comprises: (g) disposing an antireflective material on at least one of a first surface and a second surface of the first wedge-shaped component, and on at least one of a first surface and a second surface of the second wedge-shaped component.

Optionally, the method further comprises: (g) fixedly positioning a first filter component to allow radiation in the first wavelength band to be imaged on the first region of the detector; and (h) fixedly positioning a second filter component to allow radiation in the second wavelength band to be imaged on the second region of the detector.

Optionally, the fixedly positioning of the first filter comprises: (i) disposing the first filter on one of a first surface or a second surface of the first wedge-shaped component, and the fixedly positioning of the second filter comprises: (i) disposing the second filter on one of a first surface or a second surface of the second wedge-shaped component.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a device for detecting and imaging infrared radiation in at least two wavelength bands on two separate regions of a detector.

The principles and operation of the device according to the present invention may be better understood with reference to the drawings and the accompanying description.

Figure 1:
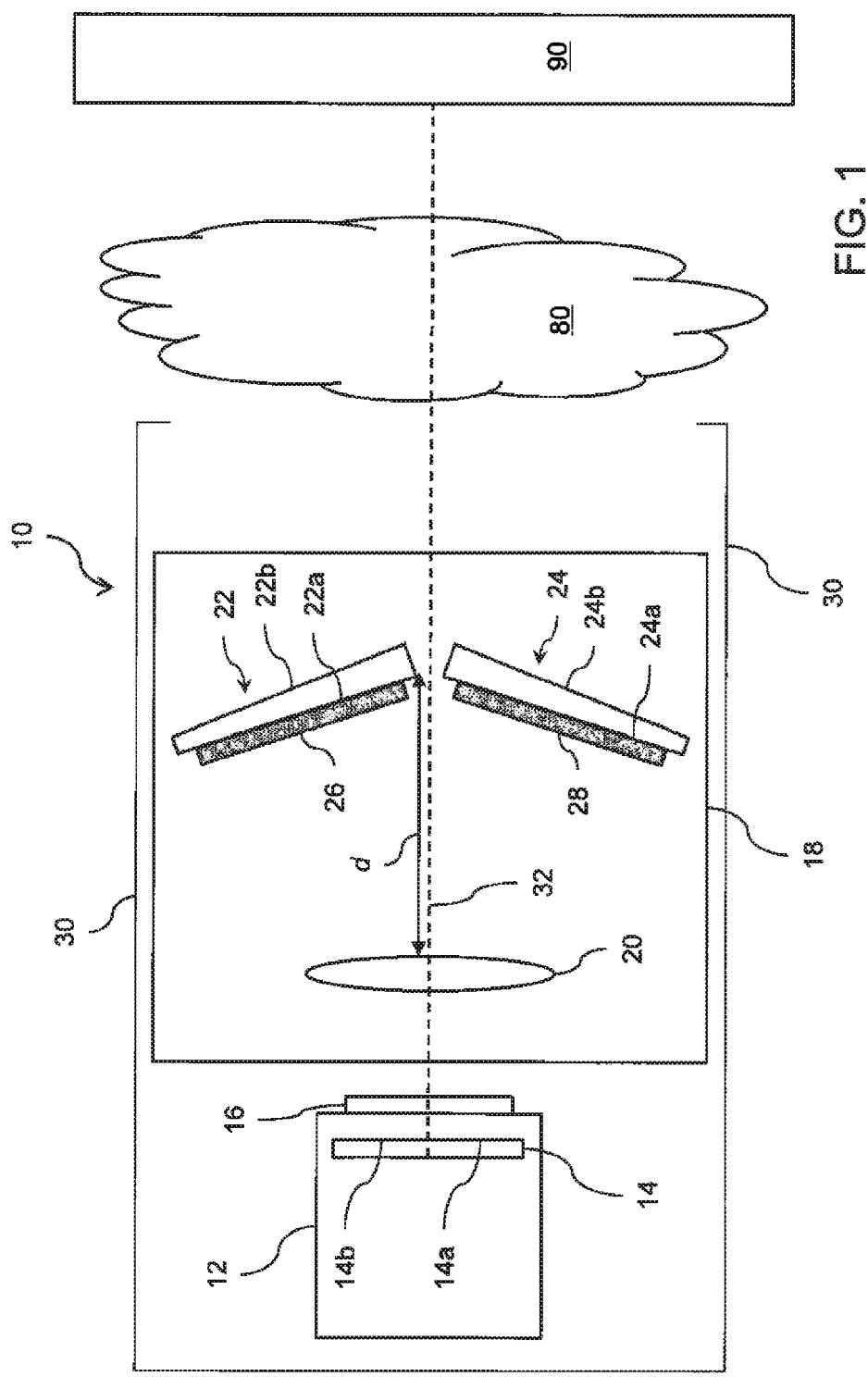
FIG. 1 is a schematic side view illustrating a device for imaging radiation from a scene according to an embodiment of the invention.

Referring now to the drawings, FIG. 1 shows a schematic illustration of an embodiment of a device 10 for imaging a scene 80, such as a gas cloud, in the infrared region of the electromagnetic spectrum, most preferably the Long-Wave Infrared (LWIR) region of the electromagnetic spectrum. When imaging such a scene, the device used for imaging the scene 80 is preferably positioned such that the scene 80 is interposed between the device 10 and a radiation emitting background 90, such as, for example, a collection of objects (such as pipes and walls), the horizon, the sky or any other suitable background. Infrared radiation in at least two wavelength bands, a first wavelength band $\lambda_G$ and a second wavelength band $\lambda_N$, is emitted from the background. The characteristics of the scene 80 are such that it is absorbent, at least in part, and emitting of radiation in one of the wavelength bands and non-absorbent (and therefore non-emitting) of radiation in the other wavelength band. For example, the scene 80 may be absorbent and emitting of radiation in the first wavelength band ($\lambda_G$) and non-absorbent and non-emitting of radiation in the second wavelength band ($\lambda_N$). As a result, data acquired through a filter approximately centered about $\lambda_G$ includes information about both the gas presence and the background emission. Similarly, data acquired through a filter approximately centered about $\lambda_N$ includes information about the background emission, but does not include information about the gas presence. The algorithms mentioned above subsequently extract relevant gas cloud information from the acquired data.

The imaging itself is done by an infrared detector array 14. The detector array 14 is an uncooled detector array, such as, for example, a microbolometer type array. The detector array 14 may be positioned within a detector case 12 positioned within the device 10. Radiation from the scene 80 and the background 90 is focused onto the detector array 14 through a window 16 by collection optics 18 whose optical components are represented symbolically in FIG. 1 by objective lens 20 and first and second wedge-shaped components 22 and 24. Note that "objective lens" 20 may actually be a set of one or more lenses that is represented in FIG. 1 by a single lens. The collection optics 18 can be considered as an enclosure volume for maintaining the position and the orientation of the optical components. The device 10 can be considered as an enclosure volume, defined by internal walls 30, for maintaining the position and orientation of the collection optics 18 and the detector array 14. The window 16 and the objective lens 20 are preferably made of materials, such as, for example, germanium, silicon, zinc sulfide or zinc selenide, which are transparent in the infrared region.

Figure 4:
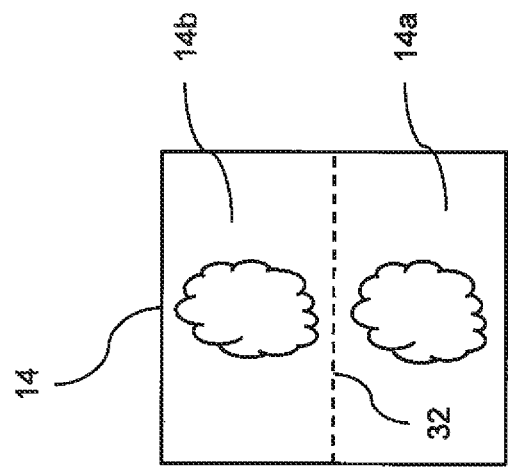
FIG. 4 is a schematic front view illustrating a detector and the resulting image formed on the detector, according to an embodiment of the invention.

The wedge-shaped components 22 and 24 are preferably implemented as transmitting plates which are transmissive to the wavelength bands of the infrared radiation from the scene 80 and the background 90. The objective lens 20 focuses radiation deflected by the wedge-shaped components 22 and 24 on the detector array 14 to form two simultaneous and separate images of the scene 80 on the background 90, each image being formed on one half of the detector surface, as shown in FIG. 4.

For clarity of illustration, the image acquisition electronics associated with the detector array 14 are not shown in FIG. 1.

The detector array 14 is divided into two non-overlapping regions, a first detector region 14a and a second detector region 14b. As should be apparent, each of the detector regions preferably includes a plurality of detector elements (not shown) corresponding to individual pixels of the imaged scene. The detector array 14 is divided into the two equal aforementioned regions by a dividing plane 32 in FIG. 1, perpendicular to the detector surface and to the plane of the page, represented by the line 32 in FIG. 4. The optical axis of the collection optics 18 lies in the dividing plane 32.

In a non-limiting example, FIG. 1 includes the Cartesian coordinate system XYZ. In the non-limiting exemplary representation of the coordinate system XYZ in FIG. 1, the detector plane is parallel to the YZ plane. Accordingly, the dividing plane 32 is parallel to the XZ plane and the optical axis is parallel to the X-axis. The wedge-shaped components 22 and 24 are wedge-shaped in the XY plane. Continued reference will be made to the non-limiting exemplary representation of the coordinate system XYZ in FIG. 1 throughout this description. A front view of the detector plane and scene images is depicted in FIG. 4.

The optical components of the collection optics 18 are arranged such that the numerical aperture of the collection optics 18 at the detector array 14 is effectively large. Having a large numerical aperture provides higher sensitivity of the detector array 14 to the radiation from the scene 80, and less sensitivity to radiation originating from within the internal walls 30 of the device 10, the collection optics 18, and the optical components themselves. Optical systems having a large numerical aperture have a correspondingly small f-number (defined as the ratio between the focal length and the aperture diameter of the optical system) at the detector. As will be discussed, the position of the wedge-shaped components 22 and 24 along the optical axis 32 relative to the objective lens 20 provides a numerical aperture of at least ⅓, corresponding to an f-number of less than 1.5 at the detector array 14.

As will be detailed below, the components of the device 10 to be discussed are placed in the device 10 in a fixed position and are not movable, thereby attaining the above mentioned f-number and numerical aperture bounds with no moving parts.

Figure 2:
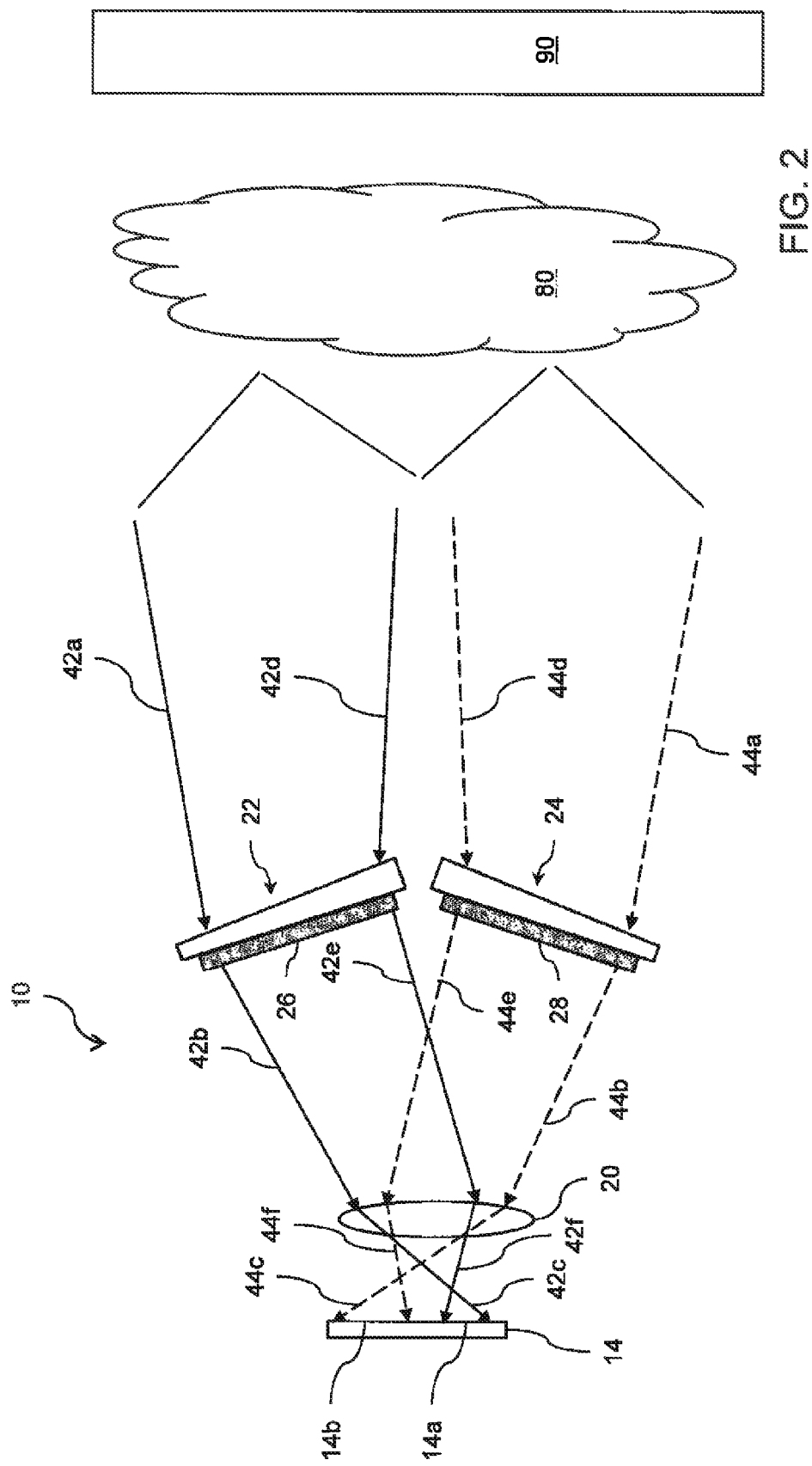
FIG. 2 is a schematic side view illustrating the traversal of incident rays from the scene and scene background through the device according to an embodiment of the invention.

Refer now to FIG. 2, the traversal of incident rays from the scene 80 and the background 90 to the detector array 14. For clarity of illustration, the internal walls 30, the collection optics 18, the detector case 12, and the window 16 are not shown in FIG. 2.

The broken line between the scene 80 and the device 10 signifies that the distance between the scene 80 and the device 10 as depicted in FIG. 2 is not to scale. In general, the distance between the scene 80 and the device 10 is much larger than the size of the device 10 itself, and is typically on the order of tens or hundreds of meters. Additionally, the broken line signifies that the two bundles of rays 42a, 42d and 44a, 44d both originate from the entire scene and not from one half of the scene.

With continued reference to FIG. 2, incident ray 42a is deflected by the first wedge-shaped component 22 resulting in a deflected ray 42b. The deflected ray 42b is focused by the objective lens 20 resulting in a focused ray 42c which is imaged on the first detector region 14a. For clarity of illustration, the rays 42a-42d are represented by continuous lines in FIG. 2. Similarly, incident ray 44a is deflected by the second wedge-shaped component 24 resulting in a deflected ray 44b. The deflected ray 44b is focused by the objective lens 20 resulting in a focused ray 44c which is imaged on the second detector region 14b. For clarity of illustration, the rays 44a-44d are represented by dashed lines in FIG. 2.

Note that although only four incident rays 42a, 42d and 44a, 44d are depicted in FIG. 2 (these are the marginal rays which define the field of view of the device in the plane of the cross section defined by the plane of the paper (XY plane)), it should be apparent that additional similar incident rays originating from the scene 80 are present and follow a path of traversal similar to the rays as described above. As such, reference to the incident rays 42a, 42d and 44a, 44d implicitly applies to all such similar incident rays originating from the scene 80 within the field of view.

Note that the incident rays 42a and 44d are parallel to each other, as are the incident rays 42d and 44a. Such a parallel relationship exists for additional pairs of incident rays (not shown) in which each ray of the pair is part of a different bundle. The parallel relationship is a result of each pair of incident rays originating from the same region of the scene 80 and background 90.

Accordingly, the incident rays which traverse the first wedge-shaped component 22 are imaged on the first detector region 14a, and the incident rays which traverse the second wedge-shaped component 24 are imaged on the second detector region 14b. As a result, the radiation from the same scene 80 and background 90 is imaged separately and simultaneously onto the detector regions 14a and 14b. This separation of the two images of the scene 80 and background 90 allows for a double filtering arrangement for gathering spectral information in order to measure and detect the gas.

In the absence of the wedge-shaped components 22 and 24, the imaging device (detector array 14 and objective lens 20) has a field of view which can be defined by a cone originating at or near the objective lens 20 and extending towards the scene 80. The field of view of such a device can equivalently be interpreted as the field of view of the objective lens 20 in combination with the detector 14. The distance and orientation of the wedge-shaped components 22 and 24 relative to the objective lens 20 is such that the field of view of the objective lens 20 in the vertical direction (XY plane) can be visualized as the angle between the deflected rays 42b and 44b.

The angles by which the incident rays 42a, 42d and 44a and 44d are deflected are a function of the angle of incidence, the apex angle of the wedge-shaped components 22 and 24, and the index of refraction of the material used to construct the wedge-shaped components 22 and 24. Accordingly, it is preferred that the above mentioned apex angle and material are selected such that the incident rays 42a, 42d and 44a and 44d are deflected by an angle which is approximately ¼ of the field of view of the objective lens 20. Such a deflection angle ensures that all of the deflected rays are incident on the objective lens 20 and are within the field of view of the device 10.

Each of the wedge-shaped components 22 and 24, combined with the objective lens 20 and the detector array 14 defines a field of view. The field of view defined by the objective lens 20 and the first wedge-shaped component 22 is equal to the field of view defined by the objective lens 20 and the second wedge-shaped component 24. The field of view of the first wedge-shaped component 22 in the vertical direction (XY plane) can be visualized as the angle between the incident rays 42a and 42d. Similarly, the field of view of the second wedge-shaped component 24 in the vertical direction (XY plane) can be visualized as the angle between the incident rays 44a and 44d.

The imaging device (the detector array 14 and the objective lens 20) has an f-number defined by the focal length f and aperture diameter D of the objective lens 20. The inclusion of the wedge-shaped components 22 and 24 may cause the f-number to increase if not designed properly. Therefore, the wedge-shaped components 22 and 24 should be included in a way that, while the same scene field of view is imaged on two separate halves of the detector, the small f-number is maintained. This can be accomplished if the field of view in one direction is halved (for example in the vertical direction) and the wedge-shaped components 22 and 24 are positioned at a minimum fixed distance d along the optical axis from the objective lens 20.

Positioning the wedge-shaped components 22 and 24 at a sufficiently large enough distance from the objective lens 20, in combination with the above mentioned deflection angles, allows for the low f-number (high numerical aperture) at the detector array 14 to be maintained. This corresponds to high optical throughput of the device 10. As a result, the same radiation from the scene is deflected by the wedge-shaped components 22 and 24 toward the objective lens 20 and imaged on the detector regions 14a and 14b through an f-number of the collection optics 18 which can be maintained close to 1 (f/1) without having to decrease the focal length f or increase the aperture diameter D.

As a result of positioning the wedge-shaped components 22 and 24 at the distance d, the vertical fields of view of the wedge-shaped components 22 and 24 are approximately half of the above mentioned vertical field of view of the objective lens 20. Note that the field of view of the device with the wedge-shaped components 22 and 24 in the horizontal direction (XZ plane) is the same as the field of view of the device without the wedge-shaped components (no need to compromise there).

Positioning the wedge-shaped components 22 and 24 too close to the objective lens 20 (i.e. d too small) would not allow for the separation of the two images of the same field of view (albeit halved) through the two different filtering components necessary for the detection of the presence or absence of a gas cloud while at the same time maintaining the low f-number for collection of the scene radiation. The distance d which provides such high optical throughput can be approximately lower bounded by:

$$d > \frac{D}{2\tan\left(\frac{\theta}{2}\right)} \quad (1)$$

where D is the aperture diameter of the objective lens 20 and θ is the vertical field of view of the objective lens 20.

In order to help mitigate the effects of beam wander on the wedge shaped components 22 and 24 while keeping their size to a minimum the angle of each of the wedge-shaped components 22 and 24 relative to the optical axis must be designed accordingly. The distance d can also be increased beyond the minimum value described in equation (1) to mitigate the effects of beam wander.

The wedge-shaped components 22 and 24 are preferably be positioned symmetrically about the optical axis, such that each is positioned at the same distance d from the objective lens 20, and each is positioned at the same angle relative to the optical axis. Such a design ensures that the same amount of radiation is imaged on the detector regions 14a and 14b via the objective lens 20 from the wedge-shaped components 22 and 24. As is clearly shown in FIG. 2, and as supported by the incorporation by reference of U.S. Provisional Patent Application 62/088,606, the radiation deflected by each of the wedge-shaped components 22, 24 occupies substantially the total lens area of the objective lens 20.

As a result of the arrangement of the optical components of the collection optics 18, the same scene 80 and background 90 is imaged on the detector regions 14a and 14b. As previously mentioned, the characteristics of the scene 80 are such that the scene 80 affects infrared radiation in the first wavelength band ($\lambda_G$) and does not affect the radiation in the second wavelength band ($\lambda_N$). The radiation from the scene 80 which is imaged onto the first detector region 14a only includes one of the wavelength bands. The radiation from the scene 80 which is imaged onto the second detector region 14b only includes the other one of the wavelength bands. This is accomplished by positioning filters, most preferably band pass filters, in the optical train.

With reference to embodiment of the device 10 depicted in FIGS. 1 and 2, a first filter 26 and a second filter 28 are positioned relative to the respective wedge-shaped components 22 and 24.

Suppose, for example, that it is desired that the radiation from the scene 80 imaged on the first detector region 14a only includes radiation in the first wavelength band ($\lambda_G$), and the radiation from the scene 80 imaged on the second detector region 14b only includes radiation in the second wavelength band ($\lambda_N$). Accordingly, the first filter 26 eliminates radiation in spectral ranges outside of the first wavelength band ($\lambda_G$) and the second filter 28 eliminates radiation in spectral ranges outside of the second wavelength band ($\lambda_N$). Thus, the radiation from the scene 80 that is directed by the first wedge-shaped component 22 to be imaged on the first detector region 14a includes only radiation in the first wavelength band ($\lambda_G$), and the radiation from the scene 80 that is directed by the second wedge-shaped component 24 to be imaged on the second detector region 14b includes only radiation in the second wavelength band ($\lambda_N$).

In the embodiment of FIGS. 1 and 2, the filters 26 and 28 are not necessarily optical elements from the optics of the collection optics 18, but rather a coating on a first surface 22a of the first wedge-shaped component 22 and a first surface 24a of the second wedge-shaped component 24, respectively. The first surface 22a is the surface of the first wedge-shaped component 22 which is closest to the objective lens 20. Likewise, the first surface 24a is the surface of the second wedge-shaped components 24 which is closest to the objective lens 20.

Additionally, a second surface 22b of the first wedge-shaped component 22 and a second surface 24b of the second wedge-shaped component 24 may be coated with an antireflection coating. The second surfaces 22b and 24b are the respective surfaces of the wedge-shaped components 22 and 24 which are closest to the scene 80. The antireflection coating provides increased sensitivity of the device 10 to the radiation from the scene 80.

Figure 3A:
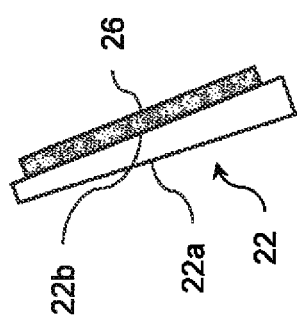
FIGS. 3A-3B are schematic illustrations showing filtering alternatives of the device according to an embodiment of the invention.
Figure 3B:
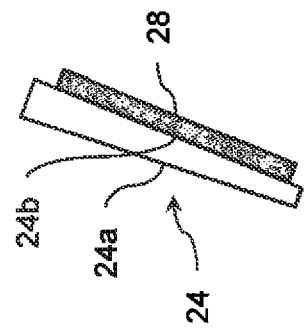

Refer now to FIGS. 3A-3B, an alternative positioning of the filters 26 and 28. Similar to the embodiment of FIGS. 1 and 2, the filters 26 and 28 are implemented as a coating, but in FIG. 3A the coating is on the second surface 22b of the first wedge-shaped component 22. Similarly, in FIG. 3B, the coating is on the second surface 24b of the second wedge-shaped component 24.

In the filter alternatives illustrated in FIGS. 3A and 3B, the first surfaces 22a and 24a may be coated with an antireflection coating. It is also noted that for clarity of illustration, the thickness of the coating for implementing the filters 26 and 28 is greatly exaggerated in FIGS. 1, 2, 3A-3B.

As previously discussed with reference to FIG. 4, each image is formed on one half of the detector surface, also referred to as the detector plane. The two halves of the detector plane depicted in FIG. 4 are shown as seen from the direction of the incoming radiation. Note that the image of the scene is formed and doubled on the detector surface after having passed through both filters separately, exemplified by the gas cloud of FIGS. 1 and 2. Both images on the detector regions 14a and 14b are upside down with respect to the scene direction, as can be understood from the path of the various rays 42a-42f and 44a-44f depicted in FIG. 2.

As should be apparent, combinations of the above mentioned filter implementations may be possible. For example, the first filter 26 may be implemented as a coating on the first surface 22a of the first wedge-shaped component 22, while the second filter 28 may be implemented as a coating on the second surface 24b of the second wedge-shaped component 24. Note that in any of the possible filter implementations, the first and second filters 26 and 28 are in fixed positions relative to the detector array 14 and the collection optics 18.

It will be appreciated that the above descriptions are intended only to serve as examples, and that many other embodiments are possible within the scope of the present invention as defined in the appended claims.

What is claimed is:

1. A device for imaging radiation from a scene, the radiation including at least a first and second wavelength band, the device comprising:
    (a) a detector of the radiation from the scene, the detector including a first and second detector region, the first and second detector regions being separate;
    (b) a first and a second filter, the first filter associated with the first detector region for allowing radiation in the first wavelength band to be imaged on the first detector region, the second filter associated with the second detector region for allowing radiation in the second wavelength band to be imaged on the second detector region; and
    (c) an optical system for focusing the radiation from the scene onto the two separate regions of the detector, and for forming two images of the same scene on the two separate regions of the detector, the optical system comprising:
        (i) an image forming optical component for forming an image of the scene on the detector, a field of view of the scene being defined in part by the image forming optical component, and
        (ii) first and second substantially wedge-shaped components, the first wedge-shaped component associated with the first filter, the second wedge-shaped component associated with the second filter, each of the wedge-shaped components fixedly positioned at a distance from the image forming optical component greater than a minimum threshold distance, each of the wedge-shaped components directing radiation from the field of view of the scene through the image forming optical component onto the detector, the minimum threshold distance being determined according to a ratio between the aperture diameter of the image forming optical component and a function of half of the field of view defined by the image forming optical component, such that the radiation is imaged separately onto the first and second detector regions, each of the two scene images formed on each of the detector regions including radiation in one respective wavelength band.

2. The device of claim 1, wherein each of the first and second filters is a band pass filter.

3. The device of claim 1, wherein the first filter is disposed on one of a first surface or a second surface of the first wedge shaped component, and the second filter is disposed on one of a first surface or a second surface of the second wedge shaped component.

4. The device of claim 3, wherein the first surface of the first wedge-shaped component is a closest surface of the first wedge-shaped component to the image forming optical component, and the first surface of the second wedge-shaped component is a closest surface of the second wedge-shaped component to the image forming optical component, and the second surface of the first wedge-shaped component is a closest surface of the first wedge-shaped component to the scene, and the second surface of the second wedge-shaped component is a closest surface of the second wedge-shaped component to the scene.

5. The device of claim 1, wherein an antireflective material is disposed on at least one of a first surface and a second surface of the first wedge-shaped component, and on at least one of a first surface and a second of the second wedge shaped component.

6. The device of claim 1, wherein the first and second wedge-shaped components are substantially symmetrically disposed relative to an optical path of radiation.

7. The device of claim 1, wherein each of the first and second wedge-shaped components is oriented at a respective angle relative to an optical path of radiation from the scene to the detector.

8. The device of claim 1, wherein the presence of the first and second wedge-shaped components results in a vertical field of view approximately halved with respect to a field of view of the device defined by the image forming optical component.

9. The device of claim 1, wherein the function is a trigonometric function.

10. The device of claim 1, wherein the optical system includes a single focal plane.

11. The device of claim 1, wherein each of the wedge-shaped components includes a first surface that is a closest surface of the respective wedge-shaped component to the image forming optical component, and a second surface that is a closest surface of the respective wedge-shaped component to the scene, and wherein the first and second surfaces are substantially larger than the aperture diameter of the image forming optical component.

12. The device of claim 1, wherein the radiation directed by each of the wedge-shaped components occupies substantially the entirety of the area of the image forming optical component.

13. The device of claim 1, wherein at least a first portion of the radiation directed by the first wedge-shaped component occupies a first region of the image forming optical components, and wherein at least a second portion of the radiation directed by the first wedge-shaped component occupies a second region of the image forming optical component, and wherein at least a first portion of the radiation directed by the second wedge-shaped component occupies the first region of the image forming optical components, and wherein at least a second portion of the radiation directed by the second wedge-shaped component occupies the second region of the image forming optical component, and wherein the first and second regions of the image forming optical component are separated by the optical axis of the optical system.

14. A method for imaging radiation from a scene, the radiation including at least a first and second wavelength band, the method comprising:
  (a) fixedly positioning a first and a second substantially wedge-shaped component at a distance from an image forming optical component, a field of view of the scene being defined in part by the image forming optical component;
  (b) directing radiation from a field of view of the scene by the first wedge-shaped component through the image forming optical component onto a first region of a detector;
  (c) filtering the directed radiation by the first wedge-shaped component to allow radiation in the first wavelength band to be imaged on the first region of the detector;
  (d) directing radiation from the field of view of the scene by the second wedge-shaped component through the image forming optical component onto a second region of the detector, the first and second regions of the detector being separate;
  (e) filtering the directed radiation by the second wedge-shaped component to allow radiation in the second wavelength band to be imaged on the second region of the detector; and
  (f) imaging the radiation from the field of view of the scene onto the detector, the distance from the image forming optical component being greater than a minimum threshold distance determined according to a ratio between the aperture diameter of the image forming optical component and a function of half of the field of view defined by the image forming optical component, such that the radiation is imaged separately onto the first and second regions of the detector, and the imaged radiation on each of the regions of the detector including radiation in one respective wavelength band and being an image of the same scene.

15. The method of claim 14, further comprising:
  (g) orienting each of the first and second wedge-shaped components at a respective angle relative to an optical path of radiation from the scene to the detector.

16. The method of claim 14, further comprising:
  (g) disposing an antireflective material on at least one of a first surface and a second surface of the first wedge-shaped component, and on at least one of a first surface and a second surface of the second wedge-shaped component.

17. The method of claim 14, further comprising:
  (g) fixedly positioning a first filter component to allow radiation in the first wavelength band to be imaged on the first region of the detector; and
  (h) fixedly positioning a second filter component to allow radiation in the second wavelength band to be imaged on the second region of the detector.

18. The method of claim 17, wherein the fixedly positioning of the first filter comprises:
  (i) disposing the first filter on one of a first surface or a second surface of the first wedge-shaped component,
  and wherein the fixedly positioning of the second filter comprises:
  (i) disposing the second filter on one of a first surface or a second surface of the second wedge-shaped component.

19. A device for imaging radiation from a scene, the radiation including at least a first and second wavelength band, the device comprising:
  (a) a detector of the radiation from the scene, the detector including a first and second detector region, the first and second detector regions being separate;
  (b) a first and a second filter, the first filter associated with the first detector region for allowing radiation in the first wavelength band to be imaged on the first detector region, the second filter associated with the second detector region for allowing radiation in the second wavelength band to be imaged on the second detector region; and
  (c) an optical system for focusing the radiation from the scene onto the two separate regions of the detector, and for forming two images of the same scene on the two separate regions of the detector, the optical system comprising:
    (i) an image forming optical component for forming an image of the scene on the detector, and
    (ii) first and second substantially wedge-shaped components, the first wedge-shaped component associated with the first filter, the second wedge-shaped component associated with the second filter, each of the wedge-shaped components fixedly positioned at a distance from the image forming optical component, each of the wedge-shaped components directing radiation from a field of view of the scene through the image forming optical component onto the detector, the radiation directed by each of the wedge-shaped components occupying substantially the entirety of the area of the image forming optical component, such that the radiation is imaged separately onto the first and second detector regions, each of the two scene images formed on each of the detector regions including radiation in one respective wavelength band.

* * * * *

UNITED STATES PATENT AND TRADEMARK OFFICE
CERTIFICATE OF CORRECTION

| | | |
|---|---|---|
| PATENT NO. | : 9,759,611 B2 | Page 1 of 1 |
| APPLICATION NO. | : 14/949909 | |
| DATED | : September 12, 2017 | |
| INVENTOR(S) | : Moshe Lavi | |

It is certified that error appears in the above-identified patent and that said Letters Patent is hereby corrected as shown below:

In the Claims

Claim 14, Column 11 should be corrected as follows:
Line 36 Change:
-- a first region of a detector --
To:
"a first region of a"

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*